(12) United States Patent
Webster et al.

(10) Patent No.: US 11,807,143 B2
(45) Date of Patent: Nov. 7, 2023

(54) VEHICLE SEATING SYSTEM AND METHOD FOR PRODUCING SAME

(71) Applicant: LEAR CORPORATION, Southfield, MI (US)

(72) Inventors: William Webster, Millington, MI (US); David Abdella, Royal Oak, MI (US); Joshua Hallock, Warren, MI (US); Samuel Blair, Troy, MI (US); Patrick J. Carlsen, Grosse Pointe Woods, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/540,547

(22) Filed: Dec. 2, 2021

(65) Prior Publication Data
US 2023/0173964 A1 Jun. 8, 2023

(51) Int. Cl.
*B60N 2/56* (2006.01)
*B29D 99/00* (2010.01)
*B60N 2/64* (2006.01)
*B60N 2/70* (2006.01)
*B60N 2/58* (2006.01)

(52) U.S. Cl.
CPC ......... *B60N 2/7035* (2013.01); *B60N 2/5825* (2013.01); *B60N 2/5883* (2013.01); *B60N 2/7017* (2013.01)

(58) Field of Classification Search
CPC ... B60N 2/7035; B60N 2/5825; B60N 2/5883
See application file for complete search history.

(56) References Cited

U.S. PATENT DOCUMENTS

| | | | |
|---|---|---|---|
| 4,751,029 A | 6/1988 | Swanson | |
| 4,859,516 A | 8/1989 | Yamanaka et al. | |
| 4,913,757 A | 4/1990 | Yamanaka et al. | |
| 4,952,265 A | 8/1990 | Yamanaka et al. | |
| 5,405,178 A * | 4/1995 | Weingartner | B60N 2/58 297/DIG. 5 |
| 5,464,491 A | 11/1995 | Yamanaka | |

(Continued)

FOREIGN PATENT DOCUMENTS

| | | |
|---|---|---|
| CN | 106387295 A | 2/2017 |
| CN | 113930900 B | 1/2023 |

(Continued)

OTHER PUBLICATIONS

International Search Report and Written Opinion for Application No. PCT/US2022/051316, dated Apr. 3, 2023, 13 Pages.

*Primary Examiner* — Shin H Kim
(74) *Attorney, Agent, or Firm* — BROOKS KUSHMAN P.C.

(57) ABSTRACT

A vehicle seating system and a method for producing a vehicle seating system may include a cushion made at least in part from a stranded-mesh material and configured to support a seated occupant. Also included may be a support structure configured to support the cushion and a trim-cover material configured to be disposed over at least a portion of the stranded-mesh material. The stranded-mesh material may include an integrated attachment arrangement configured to receive a fastening arrangement for securing the trim-cover material to the stranded-mesh material.

17 Claims, 3 Drawing Sheets

(56) References Cited

U.S. PATENT DOCUMENTS

| | | | |
|---|---|---|---|
| 5,639,543 A | 6/1997 | Isoda et al. | |
| 6,283,552 B1 | 9/2001 | Halse et al. | |
| 6,347,790 B1 | 2/2002 | Nishibori et al. | |
| 6,668,429 B2 | 12/2003 | Fujisawa et al. | |
| 7,073,230 B2 | 7/2006 | Boville | |
| 7,377,762 B2 | 5/2008 | Nishibori et al. | |
| 7,506,939 B2 | 3/2009 | Brockschneider et al. | |
| 7,547,061 B2 | 6/2009 | Horimatsu et al. | |
| 7,622,179 B2 | 11/2009 | Patel | |
| 7,625,629 B2 | 12/2009 | Takaoka | |
| 7,669,925 B2 | 3/2010 | Beck et al. | |
| 7,707,743 B2 * | 5/2010 | Schindler | A43B 7/1445 36/27 |
| 7,993,734 B2 | 8/2011 | Takaoka | |
| 8,052,212 B2 | 11/2011 | Backendorf | |
| 8,056,263 B2 * | 11/2011 | Schindler | A43B 13/14 36/27 |
| 8,226,882 B2 | 7/2012 | Takaoka | |
| 8,277,210 B2 | 10/2012 | Takaoka | |
| 8,563,121 B2 | 10/2013 | Takaoka | |
| 8,563,123 B2 | 10/2013 | Takaoka | |
| 8,568,635 B2 | 10/2013 | Takaoka | |
| 8,721,825 B2 | 5/2014 | Takaoka | |
| 8,752,902 B2 | 6/2014 | Labish | |
| 8,757,996 B2 | 6/2014 | Takaoka | |
| 8,828,293 B2 | 9/2014 | Takaoka | |
| 9,168,854 B2 * | 10/2015 | Ursino | B60N 2/7094 |
| 9,169,585 B2 | 10/2015 | Takaoka | |
| 9,174,404 B2 | 11/2015 | Takaoka | |
| 9,194,066 B2 | 11/2015 | Takaoka | |
| 9,334,593 B2 | 5/2016 | Sasaki | |
| 9,440,390 B2 | 9/2016 | Takaoka | |
| 9,456,702 B2 * | 10/2016 | Miyata | A47C 27/14 |
| 9,528,209 B2 | 12/2016 | Takaoka | |
| 9,561,612 B2 | 2/2017 | Takaoka | |
| 9,598,803 B2 | 3/2017 | Takaoka | |
| 9,615,670 B2 | 4/2017 | Takaoka | |
| 9,688,007 B2 | 6/2017 | Cheng | |
| 9,918,559 B2 | 3/2018 | Osaki | |
| 9,918,560 B2 | 3/2018 | Osaki | |
| 10,231,511 B2 * | 3/2019 | Guyan | A43B 1/0009 |
| 10,233,073 B2 | 3/2019 | Takaoka | |
| 10,266,977 B2 | 4/2019 | Takaoka | |
| 10,328,618 B2 | 6/2019 | Takaoka | |
| 10,343,565 B2 * | 7/2019 | Baek | B60N 2/5642 |
| 10,398,236 B2 * | 9/2019 | Achten | B33Y 10/00 |
| 10,501,598 B2 * | 12/2019 | Baldwin | C08J 9/35 |
| 10,730,419 B2 | 8/2020 | Low et al. | |
| 10,744,914 B2 * | 8/2020 | Baek | B60N 2/56 |
| 10,750,820 B2 * | 8/2020 | Guyan | A43B 13/16 |
| 10,806,272 B2 | 10/2020 | Ando et al. | |
| 11,186,336 B2 * | 11/2021 | Primeaux | B62J 1/007 |
| 2003/0092335 A1 | 5/2003 | Takaoka | |
| 2005/0066423 A1 * | 3/2005 | Hogan | A41D 1/084 2/227 |
| 2006/0116045 A1 | 6/2006 | Nishibori et al. | |
| 2006/0198983 A1 | 9/2006 | Patel | |
| 2007/0001336 A1 | 1/2007 | Nishibori et al. | |
| 2009/0108494 A1 | 4/2009 | Ito et al. | |
| 2009/0269570 A1 | 10/2009 | Takaoka | |
| 2009/0269571 A1 | 10/2009 | Takaoka | |
| 2010/0181796 A1 * | 7/2010 | Galbreath | B60N 2/72 296/63 |
| 2011/0316185 A1 | 12/2011 | Takaoka | |
| 2012/0042452 A1 | 2/2012 | Takaoka | |
| 2012/0104646 A1 | 5/2012 | Takaoka | |
| 2012/0112515 A1 | 5/2012 | Labish | |
| 2012/0180939 A1 | 7/2012 | Takaoka | |
| 2012/0301701 A1 | 11/2012 | Takaoka | |
| 2012/0319323 A1 | 12/2012 | Takaoka | |
| 2012/0328722 A1 | 12/2012 | Takaoka | |
| 2013/0020016 A1 | 1/2013 | Takaoka | |
| 2013/0161858 A1 | 6/2013 | Sasaki | |
| 2013/0189472 A1 | 7/2013 | Takaoka | |
| 2014/0029900 A1 * | 1/2014 | Logan, Jr. | G02B 6/3821 29/874 |
| 2014/0035191 A1 | 2/2014 | Takaoka | |
| 2014/0037907 A1 | 2/2014 | Takaoka | |
| 2014/0037908 A1 | 2/2014 | Takaoka | |
| 2014/0138016 A1 | 5/2014 | Takaoka | |
| 2014/0167328 A1 | 6/2014 | Petzel | |
| 2014/0370769 A1 | 12/2014 | Osaki | |
| 2014/0378015 A1 | 12/2014 | Osaki | |
| 2015/0197056 A1 | 7/2015 | Takaoka | |
| 2015/0219136 A1 | 8/2015 | Koelling | |
| 2015/0274048 A1 | 10/2015 | Mogi et al. | |
| 2015/0284894 A1 | 10/2015 | Takaoka | |
| 2016/0023387 A1 | 1/2016 | Takaoka | |
| 2016/0032506 A1 | 2/2016 | Takaoka | |
| 2016/0051009 A1 * | 2/2016 | Kormann | A43B 13/10 36/103 |
| 2016/0144756 A1 | 5/2016 | Ito et al. | |
| 2016/0157628 A1 | 6/2016 | Khambete et al. | |
| 2016/0174725 A1 | 6/2016 | Takaoka | |
| 2016/0263802 A1 | 9/2016 | Takaoka | |
| 2016/0374428 A1 * | 12/2016 | Kormann | A43B 23/0215 36/28 |
| 2017/0043695 A1 | 2/2017 | Kitamoto et al. | |
| 2017/0184108 A1 * | 6/2017 | Scancarello | B33Y 10/00 |
| 2017/0332733 A1 * | 11/2017 | Cluckers | A43B 7/28 |
| 2018/0070736 A1 * | 3/2018 | Achten | A47C 23/002 |
| 2018/0086623 A1 | 3/2018 | Takaoka | |
| 2019/0125092 A1 | 5/2019 | Ando et al. | |
| 2019/0298072 A1 * | 10/2019 | Bhatia | B60N 2/565 |
| 2019/0357695 A1 * | 11/2019 | Achten | B33Y 10/00 |
| 2021/0024155 A1 * | 1/2021 | Primeaux | B62J 1/26 |

FOREIGN PATENT DOCUMENTS

| | | | |
|---|---|---|---|
| DE | 102004053133 A1 | 5/2006 | |
| DE | 112013005643 T5 | 8/2015 | |
| EP | 0240388 A2 | 10/1987 | |
| EP | 2532502 A1 | 12/2012 | |
| FR | 2432108 A1 | 2/1980 | |
| FR | 2675440 B1 | 12/1993 | |
| FR | 3050409 A1 | 10/2017 | |
| GB | 721866 | 1/1955 | |
| JP | 2001046185 A | 2/2001 | |
| JP | 2012115515 A | 6/2012 | |
| JP | 2019210565 A | 12/2019 | |

* cited by examiner

VEHICLE SEATING SYSTEM AND METHOD FOR PRODUCING SAME

TECHNICAL FIELD

The present disclosure relates to a vehicle seating system and a method for producing a vehicle seating system.

BACKGROUND

Vehicle seating systems may be relatively simple structures—e.g., an assembly of a frame, one or more cushions, and a cover material. Conversely, they can be extremely complex systems that include electromechanical or pneumatic back support, occupancy sensors, seatbelt sensors, and myriad different types of sophisticated ventilation systems, just to name a few of the possible features. One component that is common to most of these seating systems is a cushion, and in many cases a number of different cushions to provide support and comfort to a seated occupant. Many of these cushions are made from a foam material, such as injection-molded polyethylene. Injection-molded polymeric foams can be configured to accommodate seating systems with different properties. For example, the density of the foam may be engineered to provide a desired amount of support for a seated occupant, and to accommodate various ancillary systems, such as a ventilation system.

One limitation of this configuration is that the weight of the seat cushion may increase significantly when the density of the foam is increased. To address this limitation, alternative materials are being increasingly used for vehicle-seat cushions. For example, a stranded-mesh material may be used to form at least part of the seat cushion, and depending on the material used and how the strands are integrated to form the mesh, a relatively low density stranded-mesh material may provide the same or similar support as a much higher density injection-molded foam material. One limitation of using a stranded-mesh material for a seat cushion is the difficulty in attaching a trim cover to this material. To avoid sagging and bagginess, trim covers are usually secured in several places inside the seat cushion. And unlike a relatively dense injection-molded foam, it may be difficult to integrate trim-cover fasteners into a stranded-mesh material. Therefore, a need exists for a system and method for overcoming the limitations of a stranded-mesh seat cushion.

SUMMARY

Embodiments described herein may include a vehicle seating system having a cushion made at least in part from a stranded-mesh material and configured to support a seated occupant. The seating system may also include a support structure configured to support the cushion, and a trim-cover material configured to be disposed over at least a portion of the stranded-mesh material. The stranded-mesh material may include an integrated attachment arrangement configured to receive a fastening arrangement for securing the trim-cover material to the stranded-mesh material.

Embodiments described herein may include a vehicle seating system that includes a stranded-mesh material forming a cushion configured to support a seated occupant and including an integrated attachment arrangement. The vehicle seating system may also include a support structure configured to support the cushion, and a trim-cover material configured to be disposed over at least a portion of the cushion. The integrated attachment arrangement may be configured to receive a fastening arrangement for securing the trim-cover material to the stranded-mesh material.

Embodiments described herein may include a method for producing a vehicle seating system that includes providing a cushion configured to support a seated occupant. The cushion may be formed at least in part from a stranded-mesh material having a plurality of integrated polymeric strands. The method may also include integrating an attachment arrangement in the stranded-mesh material, where the integrated attachment arrangement is configured to receive a fastening arrangement for securing a trim-cover material to the stranded-mesh material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
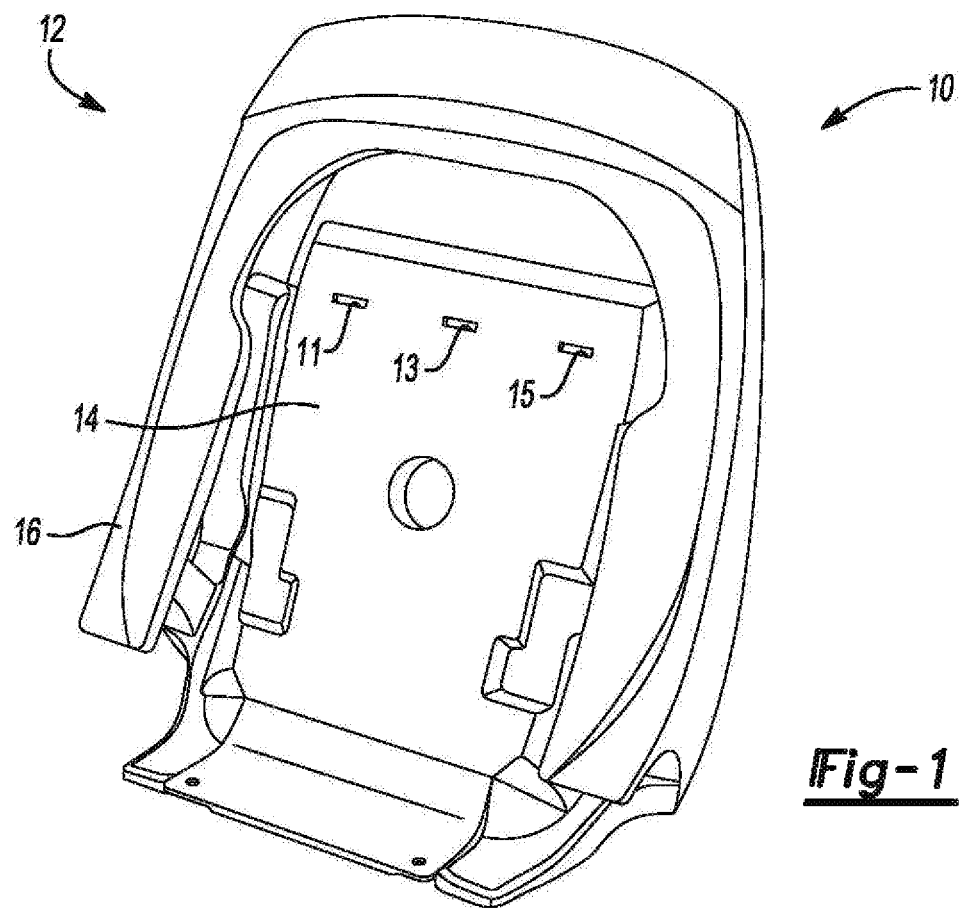
FIG. 1 shows a portion of the vehicle seating system in accordance with embodiments described herein.
Figures 4A, 4B, 4C:
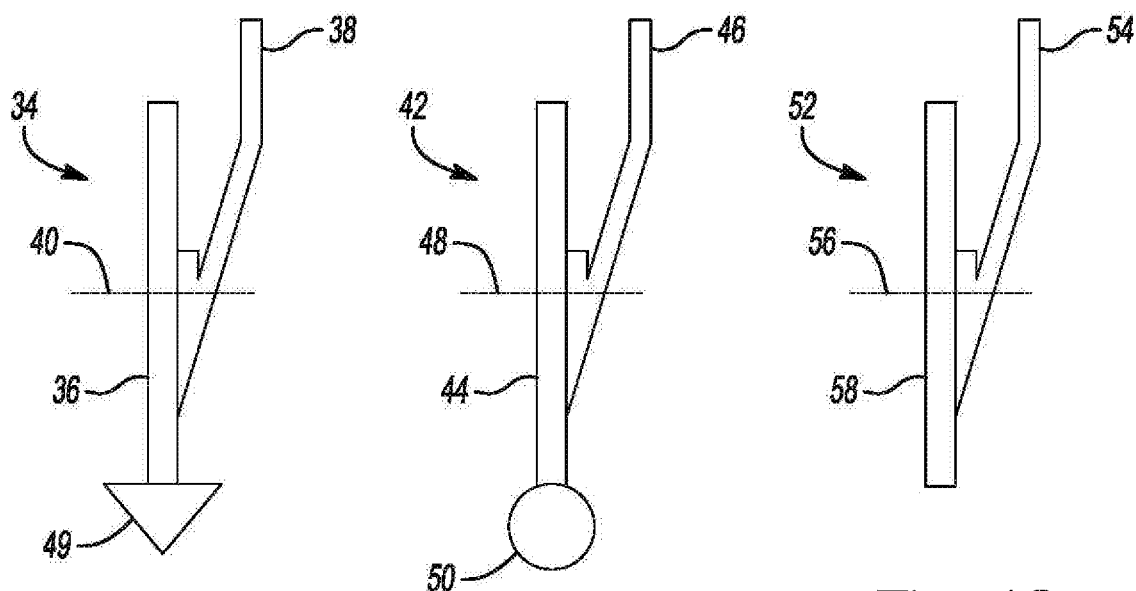
FIGS. 4A-4C show various fastening arrangements for securing a trim cover to a stranded-mesh material in accordance with embodiments described herein.
Figure 5:
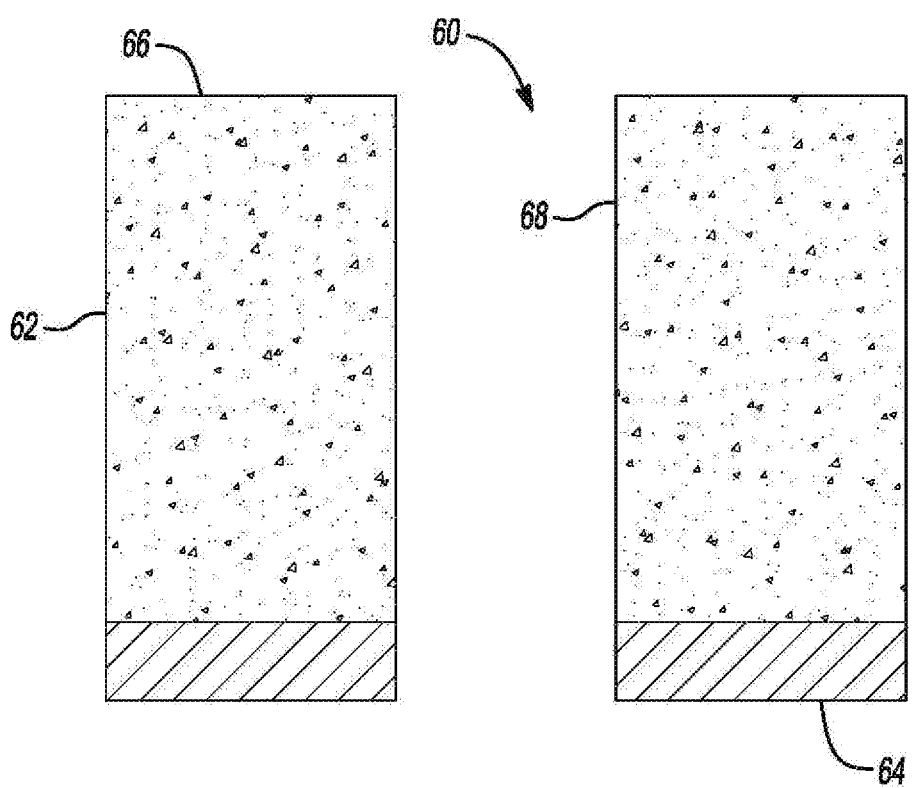
FIG. 5 shows an integrated attachment arrangement as part of a seating system in accordance with embodiments described herein.

FIG. 1 shows a portion of a vehicle seating system 10 in accordance with embodiments described herein. More specifically, FIG. 1 shows a seat back 12 that includes a cushion 14 and a support structure, such as a seat frame 16, configured to support the cushion 14. Although the embodiment shown in FIG. 1 is illustrated and described in terms of a vehicle seat back, it is understood that embodiments described herein may also apply to a seat bottom. In the embodiment shown in FIG. 1, the cushion 14 is made from a stranded-mesh material 18, which is shown in more detail in FIG. 2. As shown in FIG. 1, there are several openings 11, 13, 15 in the cushion 14. The openings 11, 13, 15 provide access to attachment features positioned within the stranded-mesh material 18, which, as explained in more detail below in conjunction with FIGS. 3-5, provide points of attachment for a trim-cover material.

Figure 2:
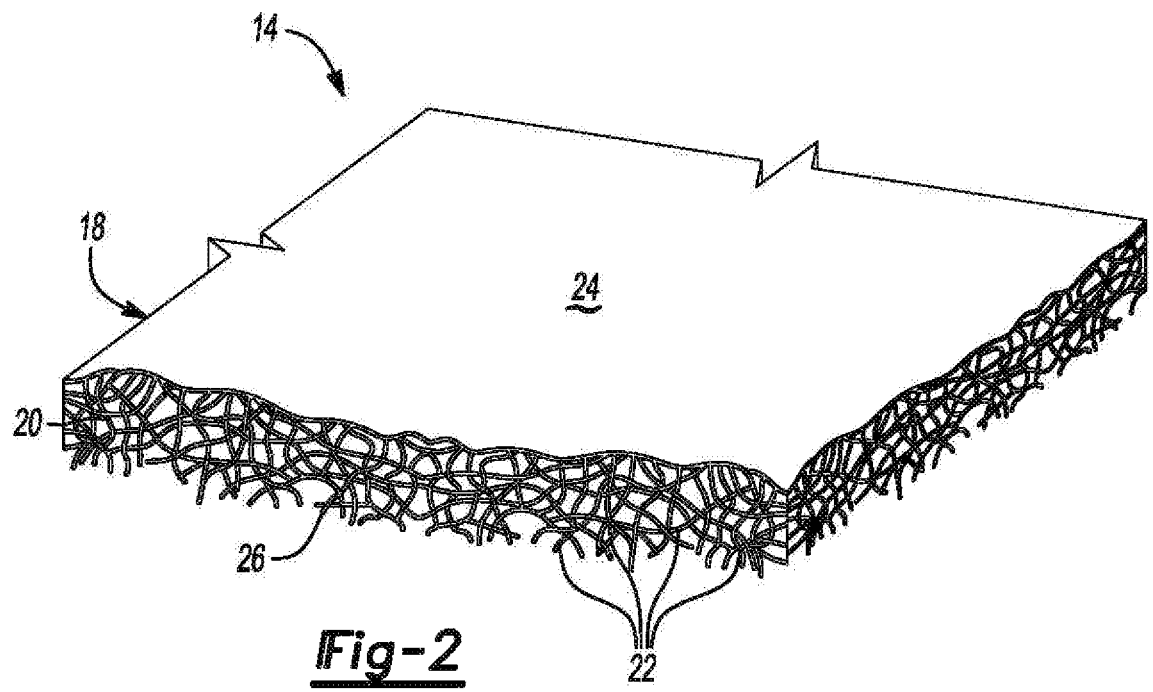
FIG. 2 shows a stranded-mesh material that may be used with the seating system shown in FIG. 1.

In the embodiment shown in FIG. 2, the stranded-mesh material 18 is made from a polymeric mesh 20 having a plurality of integrated polymeric strands 22—for clarity, only some of the strands 22 are labeled. The stranded-mesh material 18 includes a first surface 24 and a second surface 26 positioned opposite to the first surface 24. As shown in FIG. 2, the first surface 24 is substantially closed, while the second surface 26 is substantially open. The substantially closed surface 24 may include small or even microscopic pores, but the majority of the surface 24 is closed and would need to be penetrated to access the polymeric mesh 20 below. One method for producing a closed surface on a polymeric mesh such as shown in FIG. 2 is to apply heat and force until at least some of the strands 22 melt into each other to form the surface 24.

In the embodiment shown in FIG. 2, a force of about 20 pounds and a temperature of about 450° F. is sufficient to create the substantially closed surface 24. Different amounts of force and heat may be used for stranded-mesh materials made from different polymers or other materials, or for different densities and configurations of the integrated strands, such as the strands 22. The stranded-mesh material 18 may be made from, for example, a linear low density polyethylene material, although other polymers and materials effective to provide the desired properties and functionality are contemplated. As described in more detail below, the substantially closed surface 24 may form a substrate for the stranded-mesh material 18, which may be used for a number of things, including inhibiting liquid and gas penetration—including, for example, to make the surface airtight—and to facilitate attachment of a trim-cover material. Although the embodiment shown in FIG. 2 includes a substantially closed surface and a substantially open surface, other embodiments may have any number of substantially closed or substantially open surfaces, exclusively or in combination—including not just the top and bottom surfaces as shown in FIG. 2, but also on one or more of the edge surfaces.

Figure 3:
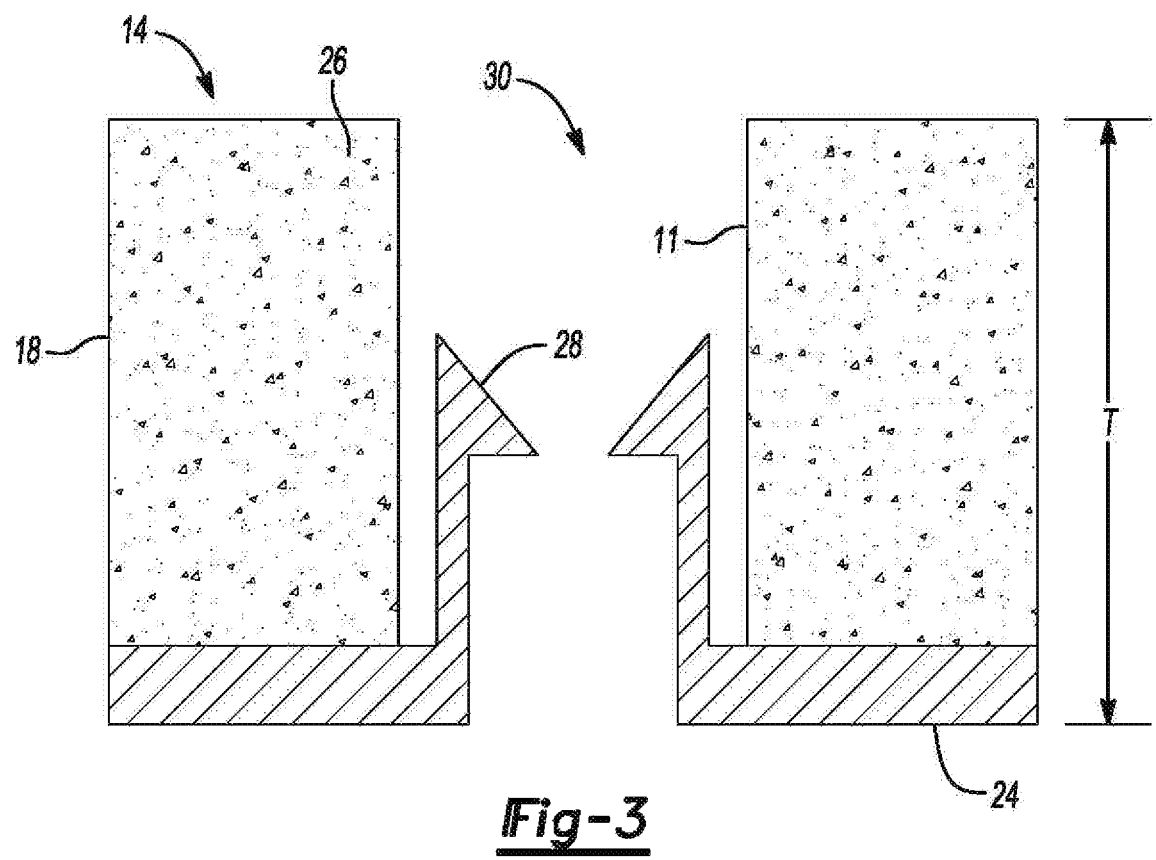
FIG. 3 shows a cross-sectional view of an integrated attachment arrangement as part of a seating system in accordance with embodiments described herein.

FIG. 3 shows a cross-sectional view of a portion of the cushion 14, and in particular, a cross section of the stranded-mesh material 18 shown in FIG. 2. The first and second surfaces 24, 26 are reversed from the orientation shown in FIG. 2. In practice, the first surface 24, which as described above forms a type of substrate, may provide support for an attachment feature such as a trim clip 28 illustrated in FIG. 3. The trim clip 28 may be bonded to the substrate 24 with heat and force, or by an adhesive. Alternatively, a trim clip may be attached to a stranded-mesh material by any other means effective to create a secure attachment. The trim clip 28 may be part of an integrated attachment arrangement 30 that also includes the aperture 11 in which the trim clip 28 is positioned. Although the aperture 11 is shown in FIG. 3 as an example, the other apertures 13, 15—see FIG. 1—may also include trim clips or other attachment features for securing a trim-cover material.

As shown in FIG. 3, the second surface 26 of the stranded-mesh material 18 is the A-surface—i.e., it is configured to receive a trim-cover material over it. Conversely, the substrate 24 is configured as the B-surface positioned downward when used on a seat bottom and toward the back when used on a seat back. In the embodiment shown in FIG. 3, the aperture 32 is disposed through a thickness (T) of the stranded-mesh material 18, including through the first and second surfaces 24, 26. As shown in FIG. 3, the thickness (T) is bounded by the first surface 24 and the second surface 26. As described above, the trim clip 28 is attached to the second surface 24 of the stranded-mesh material 18, and as shown in FIG. 3, it extends into the aperture 32, but is positioned below the second surface 26.

As described above, embodiments described herein may include a fastening arrangement for securing a trim-cover material to the stranded-mesh material 18. FIGS. 4A-4C show several types of fastening arrangements that may be used. More specifically, FIG. 4A shows a fastening arrangement 34 that includes an arrow-type tie-down 36, which may be sewn to a trim-cover material 38 along a sewing seam 40.

The arrow-type tie-down 36 may readily attach to the trim clip 28 shown in FIG. 3. Similarly, a fastening arrangement 42 includes a tie-down 44, shown in FIG. 4B; it is also sewn to a trim-cover material 46 along a sewing seam 48. Rather than having an arrowhead at its end, the tie-down 44 includes a round bead 50 that may also conveniently attached to a trim clip, such as the trim clip 28 shown in FIG. 3. The fastening arrangements 34, 42 may be used with other types of trim clips or attachment features, such as a T-shaped attachment feature that allows the arrowhead 49 or the round head 50 to be secured to it. Finally, FIG. 4C shows another type of fastening arrangement 52, which is also attached to a trim-cover material 54 along a sewing seam 56.

As shown in FIG. 4C, the fastening arrangement 52 includes a fastener 58 that has neither an arrowhead nor a round head such as the tie-downs 36, 44. Rather, this type of fastening arrangement may be referred to as a "loose T" and may be effective for attaching the trim-cover material 54 to an attachment arrangement 60 integrated into a stranded-mesh material 62 such as shown in FIG. 5. As shown in FIG. 5, the stranded-mesh material 62 includes a substantially closed surface 64 and a substantially open surface 66 positioned opposite the surface 64. The attachment arrangement 60 in this embodiment includes only an aperture 68 positioned through a thickness of the stranded-mesh material 62, including through the surfaces 64, 66. As described above, the fastening arrangement 52 shown in FIG. 4C may be used to secure the trim-cover material 54 to the stranded-mesh material 62. In particular, ends of the fastener 58 may be inserted into spaces in the stranded-mesh material 52, which keeps the trim-cover material 54 secured.

Although the embodiments described above are largely directed to a vehicle seating system, embodiments also contemplate a method for producing such a vehicle seating system. In at least some embodiments, the method may include providing a cushion formed at least in part from a stranded-mesh material, such as the material 18 illustrated and described above. The method may also include integrating an attachment arrangement, such as the attachment arrangements 30, 60 illustrated in FIG. 3 and FIG. 5, respectively. Embodiments of the method may also include forming a substantially closed surface on the stranded-mesh material by melting at least some of the integrated polymeric strands—see, e.g., the surface 24 in FIG. 3. An aperture may be formed through a thickness of the stranded-mesh material, such as the aperture 32 shown in FIG. 3. As described above, the aperture 32 is configured to receive a fastening arrangement, such as the trim clip 28. Finally, embodiments of the method may include positioning a trim clip in the aperture and then attaching the trim clip to the substantially closed surface, such as illustrated in FIG. 3 and described above.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seating system, comprising:
   a cushion made at least in part from a stranded-mesh material having a first surface and a second surface opposite the first surface and configured to support a seated occupant;

a support structure configured to support the cushion; and a trim-cover material configured to be disposed over at least a portion of the stranded-mesh material, and wherein the stranded-mesh material includes an integrated attachment arrangement configured to receive a fastening arrangement for securing the trim-cover material to the stranded-mesh material, wherein the integrated attachment arrangement includes an aperture disposed through a thickness of the stranded-mesh material and through the first surface and the second surface.

2. The vehicle seating system of claim 1, wherein the stranded-mesh material is made at least in part from a polymeric mesh having a plurality of integrated polymeric strands.

3. The vehicle seating system of claim 2, wherein at least one of the first surface or the second surface is a substantially closed surface.

4. The vehicle seating system of claim 3, wherein the substantially closed surface is formed from at least some of the integrated polymeric strands.

5. The vehicle seating system of claim 3, wherein the other of the first surface or the second surface is a substantially open surface.

6. The vehicle seating system of claim 1, wherein the aperture includes a trim clip attached to one of the first surface or the second surface and projecting into the thickness of the stranded-mesh material.

7. The vehicle seating system of claim 6, wherein the trim clip is positioned below the other one of the first surface or the second surface.

8. The vehicle seating system of claim 1, wherein the fastening arrangement includes a tie-down sewn to the trim-cover material.

9. A vehicle seating system, comprising:

a stranded-mesh material forming a cushion configured to support a seated occupant and including an integrated attachment arrangement and having a thickness bounded by a first surface and a second surface;

a support structure configured to support the cushion; and a trim-cover material configured to be disposed over at least a portion of the cushion, and wherein the integrated attachment arrangement is configured to receive a fastening arrangement for securing the trim-cover material to the stranded-mesh material;

wherein the integrated attachment arrangement includes an aperture disposed through a thickness of the stranded-mesh material and through the first surface and the second surface.

10. The vehicle seating system of claim 9, wherein the stranded-mesh material includes a plurality of integrated polymeric strands and at least one of the first surface or the second surface is a substantially closed surface formed from at least some of the integrated polymeric strands.

11. The vehicle seating system of claim 10, wherein the other of the first surface or the second surface is a substantially open surface.

12. The vehicle seating system of claim 9, wherein the aperture includes a trim clip attached to one of the first surface or the second surface and projecting into the thickness of the stranded-mesh material.

13. The vehicle seating system of claim 12, wherein the trim clip is positioned below the other one of the first surface or the second surface.

14. The vehicle seating system of claim 9, wherein the fastening arrangement includes a tie-down sewn to the trim-cover material.

15. A method for producing a vehicle seating system, comprising:

providing a cushion configured to support a seated occupant, the cushion being formed at least in part from a stranded-mesh material having a plurality of integrated polymeric strands;

integrating an attachment arrangement in the stranded-mesh material, the integrated attachment arrangement being configured to receive a fastening arrangement for securing a trim-cover material to the stranded-mesh material; and forming an aperture through a thickness of the stranded-mesh material and configured to receive the fastening arrangement, and wherein the thickness is bounded by a first surface and the second surface.

16. The method of claim 15, further comprising forming a substantially closed surface on the stranded-mesh material by melting at least some of the integrated polymeric strands.

17. The method of claim 15, further comprising positioning a trim clip in the aperture, and attaching the trim clip to one of the first surface or the second surface.

\* \* \* \* \*